United States Patent [19]

Rivas

[11] 3,851,307

[45] Nov. 26, 1974

[54] TWO (AND ONLY TWO) OUT OF SIX CHECK CIRCUIT

[75] Inventor: John M. Rivas, Bloomingdale, Ill.

[73] Assignee: GTE Automatic Electric Laboratories Incorporated, Northlake, Ill.

[22] Filed: June 25, 1973

[21] Appl. No.: 373,044

[52] U.S. Cl. .......................................... 340/146.1 AB
[51] Int. Cl. .......................................... G06f 11/08
[58] Field of Search.......................... 340/146.1 AB

[56] References Cited

UNITED STATES PATENTS 3,559,168 1/1971 Carter et al. ............. 340/146.1 AB
3,614,735 10/1971 Mauger et al. ............ 340/146.1 AB
3,688,261 8/1972 Henderson ............... 340/146.1 AB

*Primary Examiner*—Malcolm A. Morrison
*Assistant Examiner*—Jerry Smith
*Attorney, Agent, or Firm*—J. V. Lapacek

[57] ABSTRACT

A five stage logic circuit including logic And and Nand gates and wherein each of the stages receives at least one out of six input lines. The output of each And/Nand stage is dependent on the input signal to the stage. If there is an input signal present on two and only two of the six inputs, an output level is indicated at the output of the last stage.

7 Claims, 1 Drawing Figure

PATENTED NOV 26 1974
3,851,307
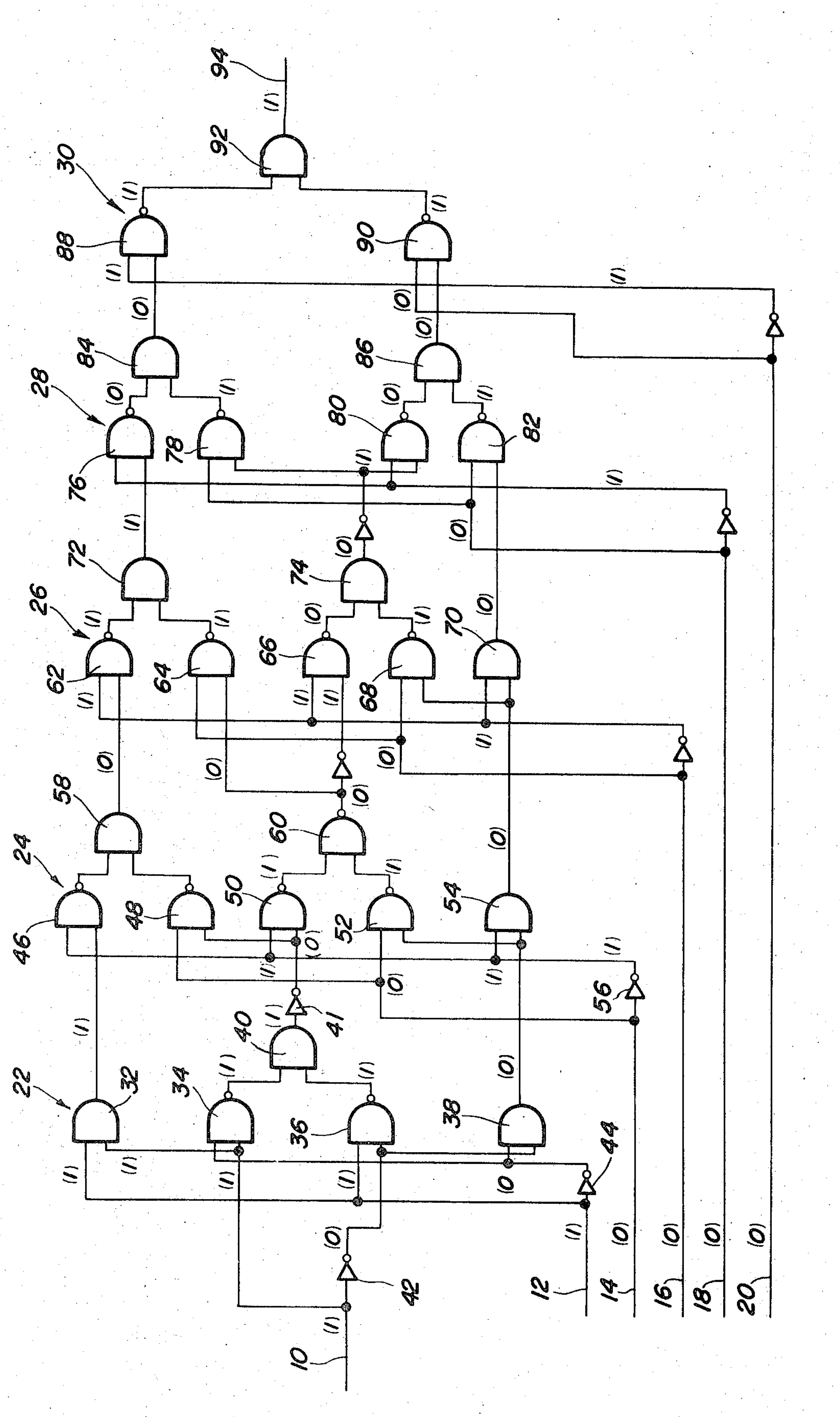

TWO (AND ONLY TWO) OUT OF SIX CHECK CIRCUIT

This invention relates to apparatus for determining the signal state of several input lines and in particular to such apparatus for detecting the presence of a signal on any two and only two out of six possible input lines.

In many systems, it is desirable to determine the presence of information on any one or more of a plurality of input lines. References may be made to the following U.S. Pat. Nos.:

| | |
|---|---|
| Gunn et al. | 3,573,729 |
| Duke | 3,541,507 |
| Winder | 3,506,845 |
| Winder | 3,487,316 |
| Winder | 3,162,774 |

and to an article entitled "One/N Digital Detector" P. Hernandez and R. Reynier, IBM Technical Disclosure Bulletin, Vol. 9, No. 10, March 1967, pages 1268–69.

In certain applications, it is particularly desired to detect the presence of information on any two and only two out of six possible input lines. That is, 1, 3, 4, 5 or 6 inputs occuring simultaneously does not produce an output. Two and only two out of six input detection has been accomplished by six, six pole double throw relays. However, present systems utilizing low level logic circuitry are susceptible to error inputs from relays which produce unacceptable electrical noise. It is desirable therefore to employ a compatible two and only two out of six detector circuit which is electrically quiet, consumes little power, and is voltage and speed compatible with the low level logic system it will operate into.

SUMMARY OF THE INVENTION

A circuit including five logic stages of And and Nand gates for detecting and indicating the presence of two and only two of six inputs. Each logic stage is coupled to at least one of the six input lines and the output of each logic stage is responsive to the presence or absence of a signal on the associated input line.

BRIEF DESCRIPTION OF THE DRAWING

The Drawing illustrates in schematic form six input lines coupled to a five stage logic circuit, each of said stages containing And gates and Nand gates for determining the presence or absence of a signal on any two and only two of the six input lines.

DETAILED DESCRIPTION

Referring now to the drawing, there is illustrated six input lines 10, 12, 14, 16, 18 and 20. Each of the input lines can be coupled to standard two level logic signals. For convenience and reference in connection with the present application, one of such levels will be termed a "one" and the other of said levels will be termed a "zero."

As illustrated in the drawing, the five logic stages of And and Nand gates are indicated by the reference numerals 22, 24, 26, 28 and 30. Thus, in logic stage 22, there is provided And gate 32, Nand gates 34 and 36, and And gate 38.

As shown, the respective outputs of Nand gates 34, 36 are coupled to And gate 40 which in turn is coupled to inverter 41. The non-inverted input on input line 10 is coupled to the input of gates 32, 34; whereas the inverted input from line 10 via inverter 42 is couplied to the input of gates 36, 38. Similarly, the non-inverted input on input line 12 is couplied to the input of gates 32, 36; whereas the inverted input from line 12 via inverter 44 is coupled to the input of gates 34, 38.

The second stage 24 of logic gates includes Nand gates 46, 48, 50, 52 and And gate 54 having input leads coupled as illustrated to the outputs of the first logic stage 22. Also, it is to be noted that the non-inverted input on line 14 is coupled to the input of gates 48, 52; whereas the inverted input from line 14 via inverter 56 is coupled to the input of gates 46, 50, 54.

An And gate 58 is coupled to the output of gates 46, 48 and And gate 60 is coupled to the output of gates 50, 52.

A third stage 26 of logic gates includes Nand gates 62, 64, 66, 68 and And gate 70. The respective non-inverted and inverted signals on input line 16 are coupled to respective logic gates in the third logic gate stage 26 as illustrated in the drawing. Also, the inputs to And gate 72 are coupled respectively to Nand gates 62, 64, and the inputs to And gate 74 are coupled respectively to Nand gates 66, 68.

A fourth stage 28 of logic gates includes Nand gates 76, 78, 80, 82 having inputs coupled as illustrated to the outputs of the third logic gate stage 26 as well as to the non-inverted and inverted signals on input line 18. Also, the input leads of an And gate 84 are coupled to the outputs of gates 76, 78 and an And gate 86 is coupled to gates 80, 82.

The fifth stage 30 of logic gates includes Nand gates 88, 90 having inputs respectively coupled as illustrated to the output of gates 84, 86 and to the non-inverted and inverted signals on input line 20. A final And gate 92 includes one input coupled to the output of gate 88 and another input coupled to the output of gate 90. The logic level on output line 94 is a one only if both inputs to And gate 92 are ones.

In operation, the five logic stages 22, 24, 26, 28, 30 respectively determine the status of input lines 10, 12, 14, 16, 18, 20 to determine if there is a one or a zero present on each line. The presence of a one on two and only two out of the six input lines provides a one output on output line 94.

As an example, assuming input lines 10, 12 are at the logic one level and the remaining input lines 14, 16, 18, 20 are at zero, the input and output signal conditions at the five logic stages are illustrated in the drawing. In the drawing, a 1 denotes for illustration that under this example the particular circuit point is at the one level. On the other hand, a 0 denotes the particular circuit point is at the logic zero level.

The foregoing detailed description has been given for clearness of understanding only, and no unnecessary limitations should be understood therefrom, as modifications will be obvious to those skilled in the art.

What is claimed is:

1. A five stage logic circuit for determining the presence of an input signal on two and only two of six input lines, said logic circuit comprising:

a first stage logic circuit having inputs coupled respectively to two of said six lines;

a second stage logic circuit having inputs coupled respectively to the output of said first stage logic circuit and to a third of said input lines;

a third stage logic circuit having inputs coupled respectively to the output of said second stage logic circuit and to a fourth of said input lines;

a fourth stage logic circuit having inputs coupled respectively to the output of said third stage logic circuit and to a fifth of said input lines;

a fifth stage logic circuit having inputs coupled respectively to the output of said fourth stage logic circuit and to a sixth of said input lines; and said first through fifth logic circuits including means responsive to the presence of two and only two input signals on said six input lines to provide an output.

2. A five stage logic circuit according to claim 1, including inverter means for respectively inverting said input signal level on each of said input lines.

3. A five stage logic circuit according to claim 2, including means for respectively coupling the non-inverted and inverted input signals of two of said input lines to said first stage logic circuit.

4. A five stage logic circuit according to claim 3, including means for coupling the non-inverted and inverted signal levels on said remaining four input lines respectively to said second, third, fourth and fifth logic stages.

5. A five stage logic circuit according to claim 1, including a final logic gate responsive to the output of said fifth logic stage to provide an output signal upon the detection of two and only two input signals on said six input lines.

6. A five stage logic circuit according to claim 1, wherein the first through fifth logic stages includes And gates.

7. A five stage logic circuit according to claim 6, wherein said first through fifth logic stages includes Nand gates.

* * * * *